United States Patent
Glaros et al.

(10) Patent No.: US 10,250,409 B2
(45) Date of Patent: *Apr. 2, 2019

(54) RECONFIGURABLE DATA DISTRIBUTION SYSTEM

(71) Applicant: SYNEXXUS, INC., Arlington, VA (US)

(72) Inventors: Gregory Emil Glaros, McLean, VA (US); Nandita Mangal, Washington, DC (US)

(73) Assignee: Synexxus, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,755

(22) Filed: Jul. 31, 2014

(65) Prior Publication Data

US 2015/0288539 A1    Oct. 8, 2015

Related U.S. Application Data

(63) Continuation of application No. 13/337,417, filed on Dec. 27, 2011, now Pat. No. 8,830,996, which is a continuation of application No. 12/473,751, filed on May 28, 2009, now Pat. No. 8,102,845.

(51) Int. Cl.
*H04L 12/46* (2006.01)
*H04L 29/08* (2006.01)
*H04L 29/06* (2006.01)

(52) U.S. Cl.
CPC ......... *H04L 12/4633* (2013.01); *H04L 67/12* (2013.01); *H04L 69/22* (2013.01)

(58) Field of Classification Search
CPC ...... H04L 12/4633; H04L 67/12; H04L 69/22
See application file for complete search history.

(56) References Cited

U.S. PATENT DOCUMENTS

| 4,100,601 | A |   | 7/1978  | Kaufman et al. |
|-----------|---|---|---------|----------------|
| 4,384,925 | A | * | 5/1983  | Stetter ............... G01N 33/0006 204/401 |
| 5,845,150 | A |   | 12/1998 | Henion |
| 6,272,283 | B1|   | 8/2001  | Nguyen |
| 7,017,059 | B2|   | 3/2006  | Law et al. |
| 7,890,194 | B2|   | 2/2011  | Pannese |

(Continued)

*Primary Examiner* — Lonnie V Sweet
(74) *Attorney, Agent, or Firm* — Sterne, Kessler, Goldstein & Fox, PLLC

(57) ABSTRACT

Systems, methods and computer programs products for a reconfigurable data distribution system are described herein. An embodiment includes a stream generator that receives analog data from a plurality of sensors. Data received from sensors, for example, may include video data received from an externally mounted camera on an armored vehicle. The stream generator converts analog data received from the sensors into a digital format that can be transmitted to a router. The router forwards the data in the digital format to a display processor. The display processor formats the data received from the router for display on a display device. The display processor may also receive data from other peripherals, including but not limited to, a touch screen device or a keypad. Furthermore, the display processor may communicate with the sensors and includes all operational information needed to operate the sensors that provide data to the stream generator, regardless of the sensors' operational platform.

25 Claims, 12 Drawing Sheets

(56) References Cited

U.S. PATENT DOCUMENTS

| | | | |
|---|---|---|---|
| 8,006,104 B1 | 8/2011 | Sivertsen | |
| 8,006,105 B1 | 8/2011 | Sivertsen | |
| 8,102,845 B2* | 1/2012 | Glaros | H04L 12/4633 370/389 |
| 8,806,074 B2 | 8/2014 | Ichieda | |
| 8,830,996 B2* | 9/2014 | Glaros | H04L 12/4633 370/389 |
| 8,909,384 B1 | 12/2014 | Beitelmal et al. | |
| 2002/0004860 A1 | 1/2002 | Roman | |
| 2002/0060627 A1* | 5/2002 | Gaiser | G01F 23/0069 340/511 |
| 2003/0016636 A1 | 1/2003 | Tani et al. | |
| 2005/0083197 A1* | 4/2005 | Glenn | G08B 25/10 340/539.22 |
| 2005/0120079 A1 | 6/2005 | Anderson et al. | |
| 2005/0138674 A1 | 6/2005 | Howard et al. | |
| 2006/0053316 A1 | 3/2006 | Yamazaki et al. | |
| 2006/0064732 A1 | 3/2006 | Hirosawa et al. | |
| 2006/0277343 A1 | 12/2006 | Lin et al. | |
| 2007/0000374 A1* | 1/2007 | Clark | G10H 1/0008 84/724 |
| 2007/0159314 A1 | 7/2007 | Zhu | |
| 2007/0162261 A1* | 7/2007 | Notstrand | G01S 13/723 702/189 |
| 2007/0208262 A1 | 9/2007 | Kovacs | |
| 2007/0245391 A1 | 10/2007 | Pont | |
| 2007/0283001 A1* | 12/2007 | Spiess | H04L 43/00 709/224 |
| 2008/0195613 A1 | 8/2008 | Sumi et al. | |
| 2008/0228968 A1 | 9/2008 | Aihara et al. | |
| 2009/0018717 A1 | 1/2009 | Reed et al. | |
| 2009/0204730 A1 | 8/2009 | Mochizuki | |
| 2009/0276110 A1* | 11/2009 | Martinez | G01S 17/026 701/23 |
| 2009/0295993 A1 | 12/2009 | Chhokra | |
| 2010/0026802 A1 | 2/2010 | Lipton et al. | |
| 2010/0303068 A1 | 12/2010 | Glaros et al. | |
| 2012/0113170 A1 | 5/2012 | Igarashi | |
| 2012/0140777 A1 | 6/2012 | Glaros et al. | |
| 2013/0061271 A1 | 3/2013 | Lu | |
| 2013/0082673 A1 | 4/2013 | Sako | |
| 2013/0098599 A1 | 4/2013 | Busch et al. | |
| 2013/0107054 A1 | 5/2013 | Ueoka et al. | |
| 2013/0107669 A1* | 5/2013 | Nickolaou | G01C 21/30 367/125 |
| 2015/0100706 A1 | 4/2015 | Glaros et al. | |
| 2015/0278214 A1 | 10/2015 | Anand et al. | |
| 2016/0154748 A1 | 6/2016 | Glaros | |

* cited by examiner

RECONFIGURABLE DATA DISTRIBUTION SYSTEM

CROSS REFERENCE TO RELATED APPLICATION

This patent application is a continuation of allowed U.S. application Ser. No. 13/337,417 filed Dec. 27, 2011, now U.S. Pat. No. 8,830,966, which is a continuation of U.S. application Ser. No. 12/473,751 filed May 28, 2009, now U.S. Pat. No. 8,102,845, which are incorporated herein by reference in their entireties.

BACKGROUND

Field of the Invention

The present invention is generally directed to networking technology, and particularly to networking of sensors for military applications.

Background Art

Armored vehicles are increasingly using several hardware and software components to meet evolving complex combat conditions.

Where both software and hardware components are tightly coupled to their proprietary platforms, systems in armored vehicles are not able to keep pace with rapid fielding of new components and capabilities as combat conditions evolve. Furthermore, the use of different proprietary operational platforms by each component vendor leads to increased system integration costs and decreased operational situational awareness.

Also, changing requirements of systems used in armored vehicles, created by emerging threats, have resulted in unacceptable delays and system performance failures in an attempt to field new technologies in such vehicles. The result is significant programmatic cost growth and an ill equipped force unable to adequately defend against a determined enemy.

The need for a comprehensive networked system approach is growing in importance and scope due to the increasing cost of integrating subsystems into armored vehicles, particularly because these vehicles have a need to access remote sensor assets and control robotic and autonomous systems. Furthermore, the United States Department of Defense has recognized a need for an open-networked system design that incorporates multiple modular sensors, communication devices, and weapon systems into a single networked architectural solution for armored vehicles, such as the Mine Resistant Armor Protected (MRAP) vehicle.

Accordingly, systems, methods and computer program products are needed that overcome limitations with existing system integration techniques used in military applications in general, and armored vehicles in particular.

BRIEF SUMMARY

Briefly stated, the invention includes system, method, computer program product embodiments and combinations and sub-combinations thereof for reconfigurable data distribution and system integration in armored vehicles.

An embodiment includes a stream generator that receives analog data from a plurality of sensors. Data received from sensors, for example, may include video data received from an externally mounted camera on an armored vehicle. Data received from the sensors may also include analog data received from temperature, pressure or mechanical sensors. The stream generator then converts analog data received from the sensors into a digital format that can be transmitted to a router. The router forwards the data in the digital format to a display processor. The display processor formats the data received from the router for display on a display device. The display processor may also receive data from other peripherals, including but not limited to, a touch screen device or a keypad. Furthermore, the display processor may communicate with the sensors and includes all operational information needed to operate the sensors that provide data to the stream generator, regardless of the sensors' operational platform.

In this way, embodiments of the invention receive and process analog data from a plurality of sensors that may be configured to operate on vendor specific platforms. This allows embodiments of the invention to format and integrate data provided by the sensors for display on a single display console for efficient sensor and system control. Furthermore, any number of additional sensors of any type may be added to provide data to the stream generator and allow vehicles and their operators to keep pace with rapid fielding of new capabilities as combat conditions evolve. Additionally, embodiments of the invention satisfy the need of United States Department of Defense for an open-networked system design that incorporates multiple modular sensors, communication devices, and weapon systems into a single networked architectural solution for armored vehicles with accessibility at the touch of a button.

BRIEF DESCRIPTION OF THE DRAWINGS/FIGURES

Figure 1A:
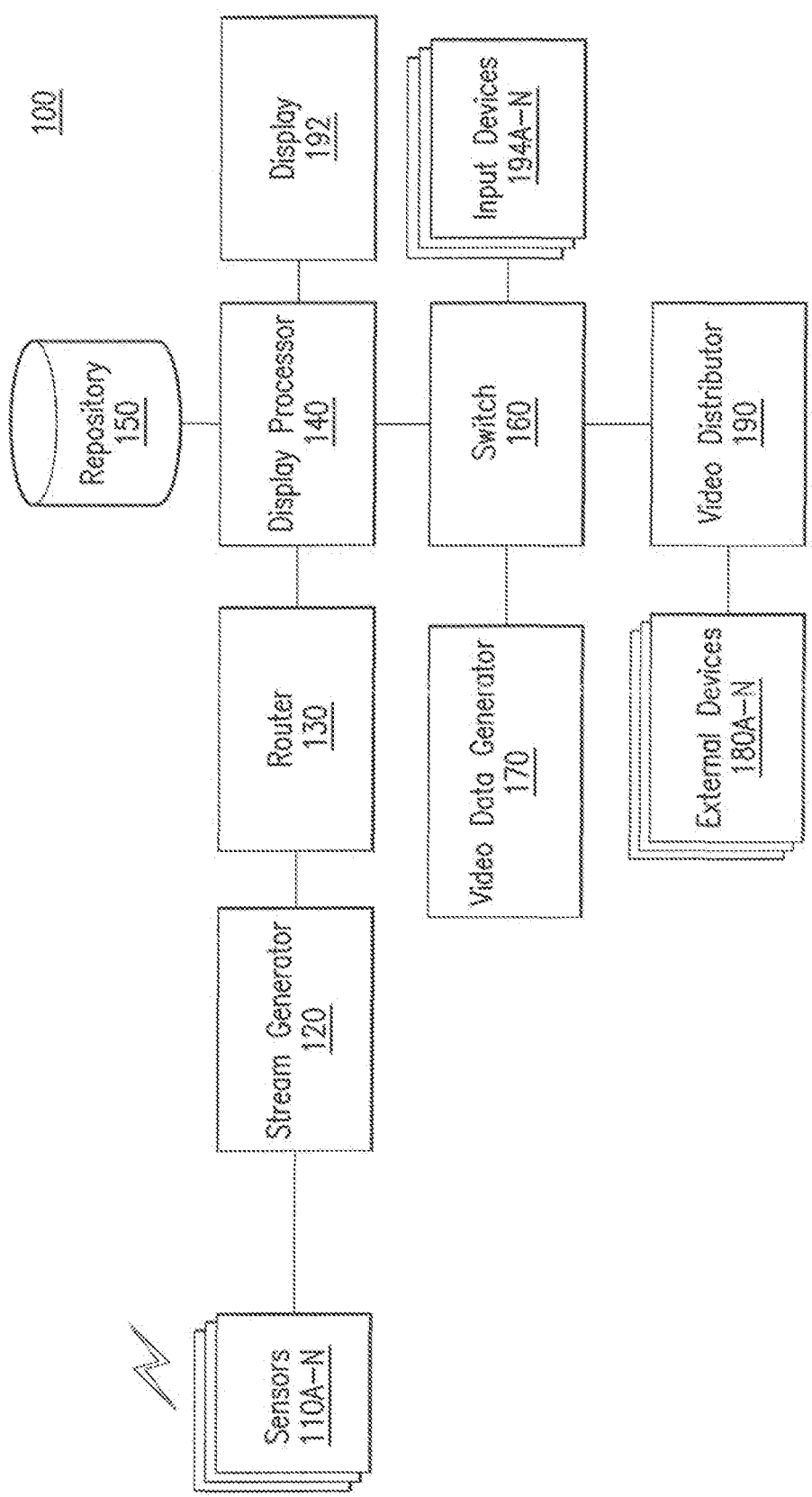
FIG. 1A is a diagram illustrating a reconfigurable data distribution system, according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

System

FIG. 1A illustrates a reconfigurable data distribution system, according to an embodiment of the invention. (While the following is described in terms of armored vehicles, combat environments and video data, the invention is not limited to this embodiment. The invention is applicable to any device having generally the structure of FIG. 1, or that would benefit from the functionality as described herein.)

FIG. 1A illustrates system 100 that includes stream generator 120, router 130, display processor 140, data repository 150, switch 160, video data generator 170, video distributor 190 and display 192. Sensors 110A-N, input devices 194A-N and external devices 180A-N may also be associated with system 100.

In an embodiment, sensors 110A-N include sensors that measure any analog parameter, including but not limited to, temperature, pressure and speed. Sensors 110A-N can also include cameras that generate video data. In another embodiment, sensors 110A-N can function as 'shot detectors' and can be used to detect mortar fire or gun shots in surrounding areas. Sensors 110A-N can also be mounted on motors or actuators that allow sensors 110A-N to be positioned (e.g. rotated) by display processor 140 based on input received from sensors 110A-N. In yet another embodiment, sensors 110A-N can be engine and embedded platform data loggers (e.g. 1939 CAN (controller-area-network) based sensors). CAN buses and CAN based sensors are known to those skilled in the art. CAN is a vehicle bus standard designed to allow microcontrollers and devices to communicate with each other within a vehicle without a host computer. FIG. 1G illustrates exemplary 1939 CAN based sensors, the output of which is processed by system 100 and displayed on display 192 according to methods described below. The invention is not limited to the example sensors mentioned herein, but instead is applicable to sensors of any type.

As an example, not intended to limit the invention, sensors 110A-N can be mounted externally on an armored vehicle. Furthermore, sensors 110A-N may wirelessly provide data to other modules in system 100. In an embodiment, sensors 110A-N provide data directly to stream generator 120 using RS-232C connectors and BNC (Bayonet Neill-Concelman) connectors.

Stream Generator 120

In an embodiment, stream generator 120 receives analog data from sensors 110A-N. Stream generator 120 then converts the analog data received from sensors 110A-N to a stream of data over the internet protocol (IP). The stream of data includes one or more IP packets that further include digital data that corresponds to the analog data received from sensors 110A-N. The IP is well known to those skilled in the art and is a protocol used for communicating data across a packet-switched network using the Internet Protocol Suite, also referred to as TCP/IP.

IP is the primary protocol in the internet layer of the internet protocol suite and has the task of delivering protocol datagrams (packets) from a source host to a destination host solely based on their addresses. For this purpose, the Internet Protocol defines addressing methods and structures for datagram encapsulation.

Therefore, in embodiments where stream generator 120 uses the IP protocol, both sensors 110A-N and stream generator 120 can each be associated with unique IP addresses. Other modules in system 100, such as router 130, display processor 140 and video distributor 190 may also have IP addresses assigned to them.

Although the following description is described in terms of IP, it is to be appreciated that any other protocol for transmitting data provided by sensors 110A-N may be used by stream generator 120. In an embodiment, stream generator 120 may also encrypt the data received from sensors 110A-N prior to transmitting the data over IP to router 130. Exemplary encryption algorithms used by stream generator 120, include, but are not limited to the FIPS-140 standard for cryptographic modules which include both hardware and software components for use by departments and agencies of the United States federal government.

Router 130 routes IP packets (or data transmitted in any other network protocol) to other modules in system 100, such as display processor 140. Router 130 may use a routing table to determine the most efficient way to route IP packets provided by stream generator 120. Although FIG. 1 illustrates a single router 130, it is to be appreciated that a system 100 is scalable and a plurality of routers may exist to expand the capabilities of system 100.

Display Processor 140

Display processor 140 formats the data received from router 130 for display on display device 192. As an example, display device 192 is a touch screen monitor. Display processor 140 may also receive data from other peripherals, including but not limited to, a touch screen device or a keypad.

In an embodiment, display processor 140 may communicate with sensors 110A-N and includes all operational information needed to operate sensors 110A-N that provide data to stream generator 120. As an example, not intended to limit the invention, if sensors 110A-N are cameras and generate video signals (e.g. RS-170 video signals) as output, display processor 140 receives data in those video signals from stream generator 120 digitized and encapsulated in IP packets. Display processor 140 then processes data encapsulated in these IP packets for display on display device 192.

Figure 1B:
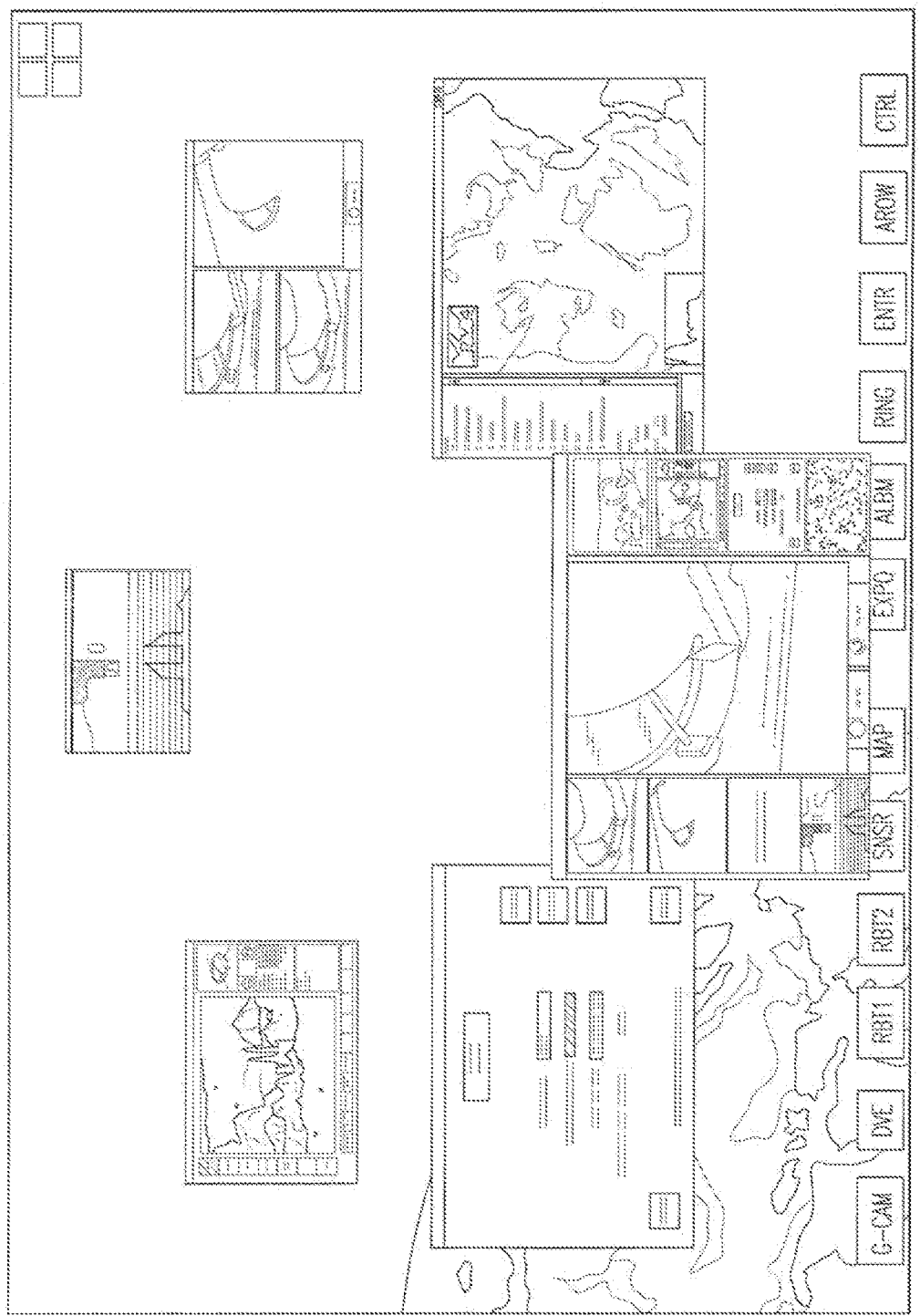
FIGS. 1B-1D are exemplary screenshots illustrating outputs from a plurality of sensors, according to an embodiment of the invention.
Figure 1C:
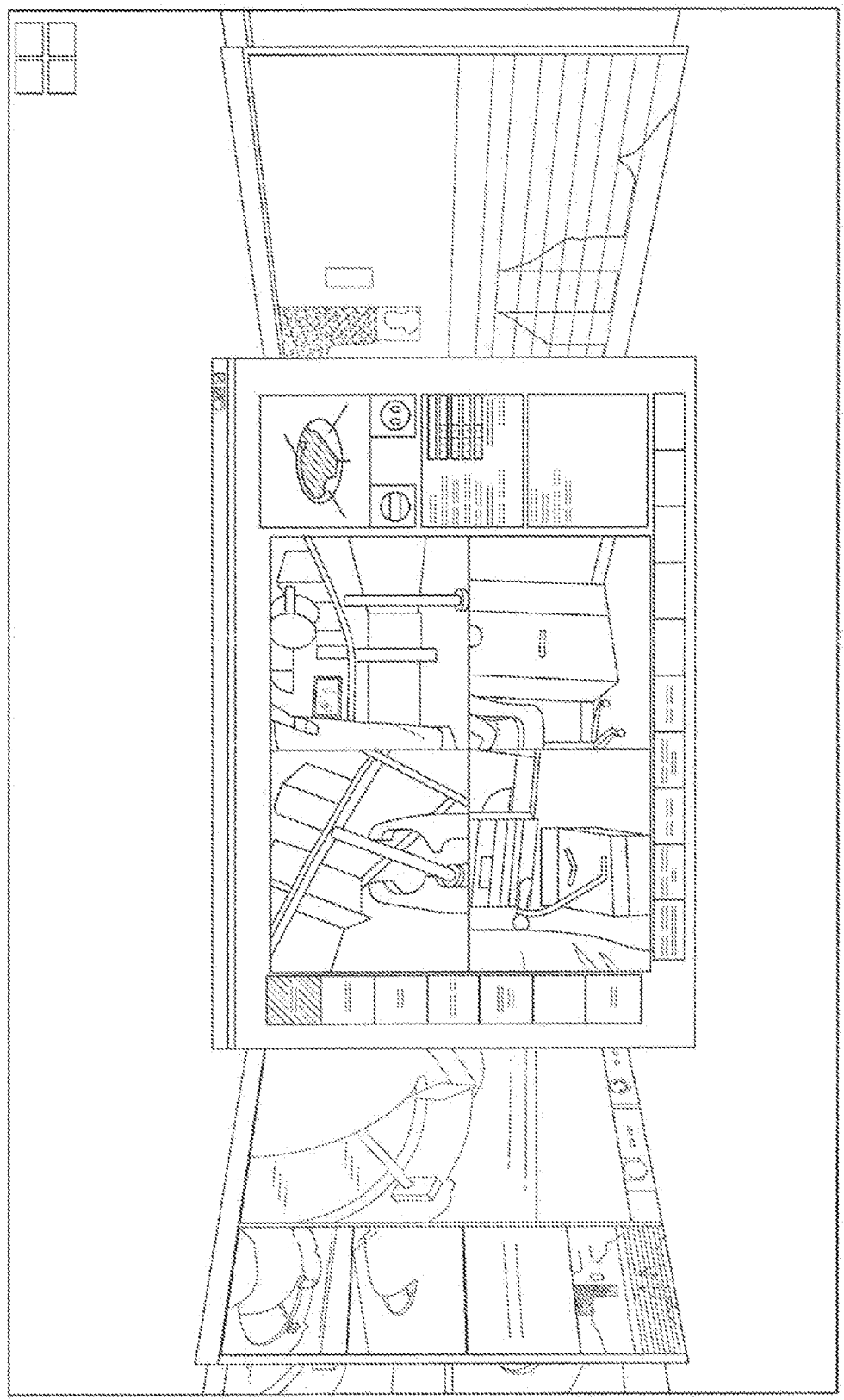
Figure 1D:
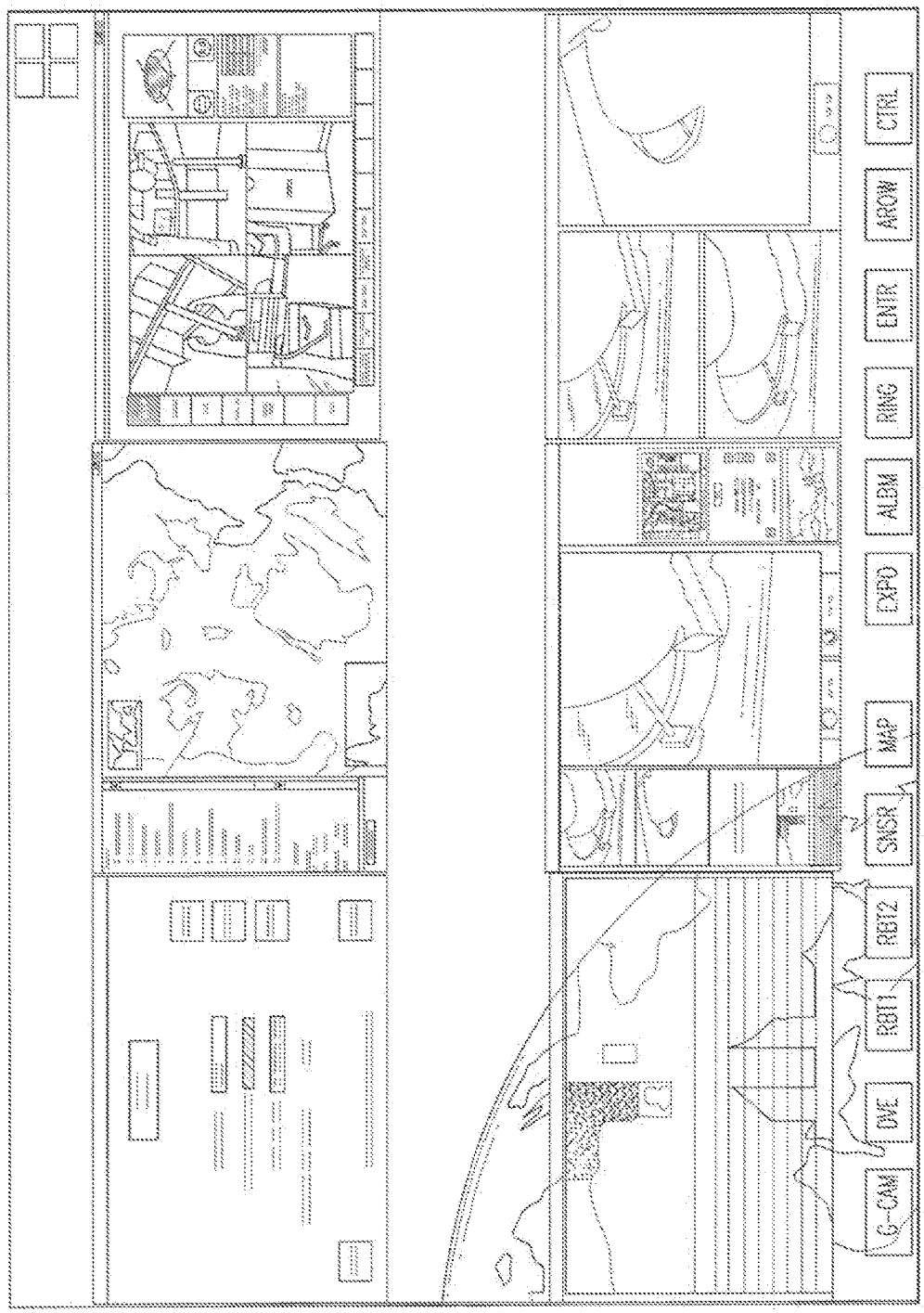

FIG. 1B is an exemplary screenshot illustrating outputs from a plurality of sensors on display 192, according to an embodiment of the invention. FIGS. 1C and 1D are also exemplary screenshots of images displayed on display 192, according to embodiments of the invention. FIG. 1C illustrates a plurality of outputs from a plurality of sensors in a manner that allows cycling through different outputs. For example, and as illustrated in FIG. 1C an output being currently viewed by an operator is placed in 'parallel' to the display screen. Other image outputs that are available from sensors 110A-N, but not being viewed by an operator, are displayed at an angle to display 192. Such an arrangement of displays is intuitive, and may greatly increase user performance, especially in combat situations.

Referring to FIG. 1D, outputs from the plurality of sensors are displayed adjacent to each other, in a manner that allows an operator of system 100 to view multiple (or all) sensor outputs simultaneously. The exemplary display arrangement illustrated in FIG. 1D may be used by operators that prefer to view more than one sensor output simultaneously. It is to be appreciated that the user interfaces illustrated in FIGS. 1C and 1D are purely illustrative and other arrangements may be used. Furthermore, a user may be able to configure any other display arrangement.

Returning to the operation of display processor 140, in an embodiment, display processor 140 receives IP packets which include MPEG frames from IP stream generator 120. Display processor 140 then processes and displays these MPEG frames to a user using display device 192. MPEG is a well known standard for audio and video compression and transmission. As an example, display processor 140 may display the MPEG frames at a rate of 30 frames per second. Although the following operation is described in terms of MPEG, it is to be appreciated that any other compression or transmission algorithm may be used by embodiments of the invention.

In an embodiment, display processor 140 processes each MPEG frame, that corresponds to video output from sensors 110A-N, using an image-processing algorithm that includes edge, motion, black and white and similarity detection techniques. Other image processing techniques may also be used by display processor 140 prior to providing the MPEG frames to display 192.

In this way, display processor 140 processes all MPEG frames and allows a user to select a video generated by displaying the processed MPEG frames. For example, a user operating system 100 may require video distinctly displaying edges of items of interest. Using embodiments of the invention, the user may select the appropriate image processing algorithm (e.g. edge detection) to view an edge detected video on display 192. Edge detection algorithms are known to those skilled in the art and include various edge detection techniques using filters such as the Sobel filter and the Canny edge detection filter.

In the embodiment where sensors 110A-N are cameras, a sensor's output may include both infra-red and night vision output in addition to a generic video signal output. In such an embodiment where sensors 110A-N produce at least three distinct outputs (e.g. night vision infra-red and generic video signal), display processor 140 may receive separate MPEG frames corresponding to each of the distinct outputs. As described earlier, display processor 140 may receive MPEG frames from sensors 110A-N through IP packets from stream generator 120. When display processor 140 receives separate MPEG frames corresponding to each of the distinct outputs (e.g. night vision infra-red and generic video signal), display processor 140 overlays and combines the MPEG frames to produce a composite output. As a purely illustrative example, display processor 140 provides a composite output that includes MPEG frames from both night vision and infrared outputs and can display both outputs simultaneously on display 192.

In an embodiment, display processor 140 may analyze the data received from stream generator 120 for real time control of sensors 110A-N. As a purely illustrative example, display processor 140 may analyze data received from sensors 110A-N to determine a geographical location from which a shot or artillery was fired. Once the location of a fired shot has been determined, display processor 140 can reposition sensor 110A-N to retrieve images or videos from the geographical location from which the shot or artillery was fired. As an example, display processor 140 can reposition sensors 110A-N by providing one or more commands to actuators associated with sensors 110A-N. Furthermore, display processor 140 may share its analysis of data received from sensors 110A-N with a user using display 192 to aid situational awareness of the user.

Figure 1E:
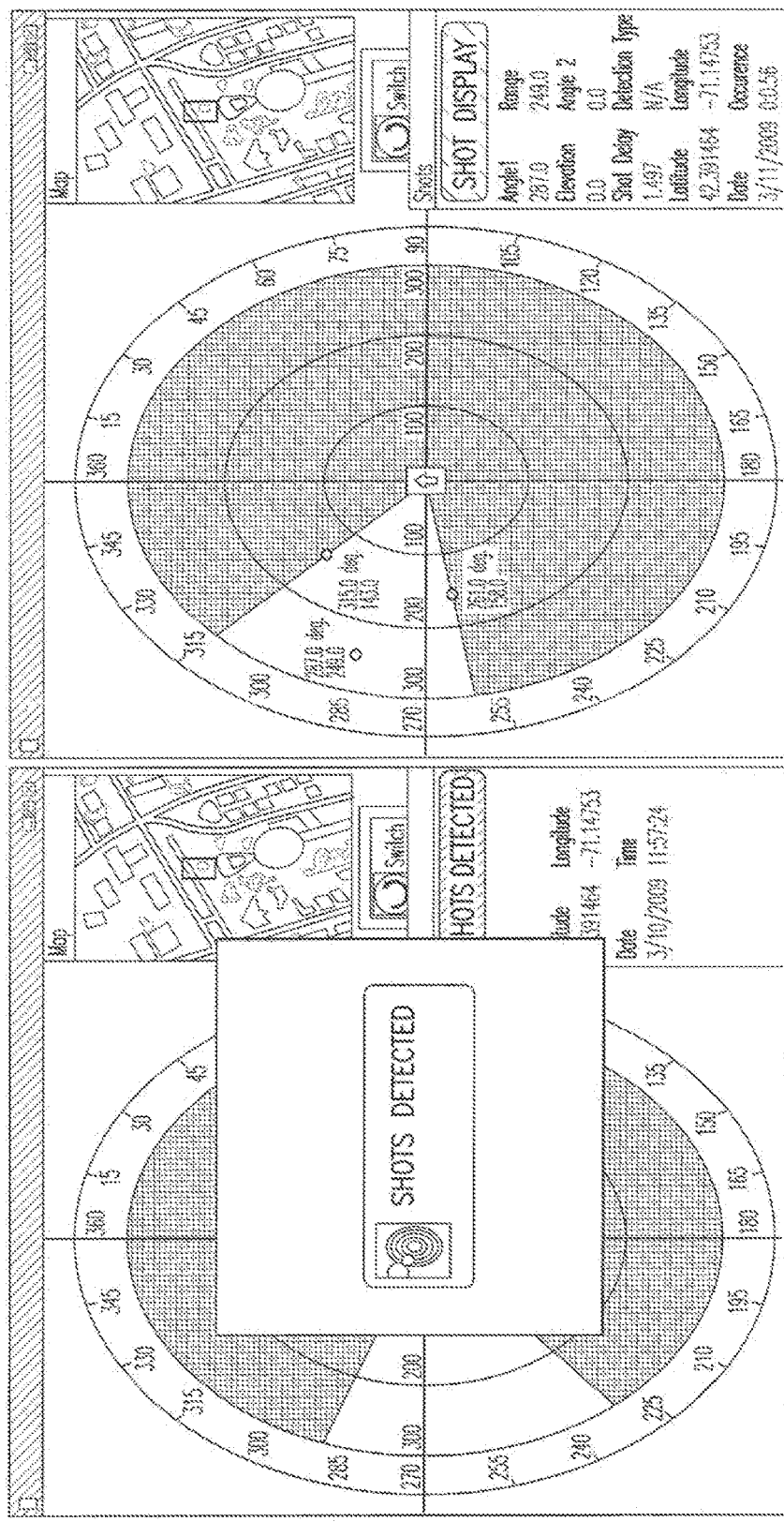
FIG. 1E is an exemplary screenshot of a shot detection system's user interface, according to an embodiment of the invention.

FIG. 1E illustrates an exemplary screenshot of a shot detection system's user interface according to an embodiment. As illustrated in FIG. 1E, whenever sensors 110A-N detect artillery fire or similar events, a 'shots detected' alert is displayed on the user interface of the shot detection system. Additionally, the latitude, longitude, elevation, date, occurrence and other such parameters associated with a fired shot are also displayed on the user interface shown in FIG. 1E. In addition, the user interface may display a satellite map and a two dimensional circular grid illustrating location of the shots fired.

In an embodiment, display processor 140 can populate display 192 with parametric data received from sensors 110A-N. As an example, such data received from sensors 110A-N can be overlaid on any MPEG video stream generated by display processor 140. For example, temperature data from thermometric sensors can be displayed textually within an MPEG video stream by embedding the textual temperature data into each MPEG frame received from stream generator 120.

In another embodiment, display processor 140 can 'tag' or embed user generated content (UGC) or any other content within content received from sensors 110A-N. As an example, embedding of content may be achieved by embedding an MPEG frame associated with UGC into MPEG frames generated by stream generator 120.

In an embodiment, display processor 140 generates panoramic views of geographical regions surveyed by sensors 110A-N. As an example, panoramic views can be generated by stitching a plurality of images retrieved from sensors 110A-N. Image stitching techniques are well known to those skilled in the art. In another embodiment, display processor may perform image stitching between images received from sensors 110A-N and images received from external devices 180A-N.

In this way, an operator of an armored vehicle can obtain panoramic visual images of a combat area without exiting the armored vehicle because panoramic projections can be displayed on display 192 located inside the armored vehicle.

In an embodiment, display processor 140 may detect a similarity between a video retrieved by sensors 110A-N and a video provided by external devices 180A-N. As an example, display processor 140 can detect a similarity between a video retrieved by sensors 110A-N and a video provided by external devices 180A-N by comparing MPEG frames associated with the videos. In an embodiment, if a similarity is detected between MPEG frames, display processor 140 can tag (or embed) a MPEG frame received from external devices 180A-N with information (e.g. GPS co-ordinates, temperature or barometric data) received from sensors 110A-N related to the MPEG frame received from external devices 180A-N. Alternatively, display processor 140 can tag (or embed) a MPEG frame received from sensors 110A-N with information received from external devices 180A-N related to the MPEG frame received from sensors 110A-N.

Data repository 150 can be used to store any form of data associated with system 100. As an example, data repository 150 can store video data received from sensors 110A-N. In an embodiment, not intended to limit the invention, a SATA based hard disk drive is used as data repository 150.

Switch 160 can be used to allow a user to control a plurality of sensors 110A-N using input devices 194A-N and display 192. As an example, switch 160 can be a keyboard-video-mouse (KVM) switch. KVM switches are known to those skilled in the art and allow a user to control multiple computers from a single keyboard, video monitor and mouse. In another example, switch 160 can be a 'KVM over IP' device that uses video capture hardware to capture video, keyboard, and mouse signals, compress and convert them into IP packets, and send them over an Ethernet link to display processor 140 that unpacks and reconstitutes a dynamic graphical image. In an embodiment, switch 160 is NSA certified and allows classified units to be interfaced with system 100 through switch 160. Switch 160 also allows a user to view any output generated by external devices 180A-N using display 192.

In an embodiment, a user may provide input (e.g. keyboard input) using input devices 194A-N to switch 160 for controlling sensors 110A-N. For example, a user may control sensors 110A-N by using an API (Application Program Interface) associated with sensors 110A-N. By providing appropriate commands to switch 160 in accordance with the respective APIs of the sensors 110A-N, the user can re-configure (or re-purpose) or otherwise control sensors 110A-N. Also, the user is able to view any output associated with sensors 110A-N on display 192. In this way, by using switch 160, a user can control a plurality of sensors 110A-N by providing appropriate commands to their APIs using input devices 194A-N.

In an embodiment, if an API associated with sensors 110A-N is not available (i.e. not known or no API exists), switch 160 translates inputs received from input devices 194A-N into appropriate control voltage (or other electrical or digital signal) levels that are applied directly to sensors 110A-N. As an example, not intended to limit the invention, such control voltage levels may be based on a conversion table that maps keyboard inputs to appropriate control voltage levels. Such keyboard input may be from the operator or user manual of the sensor 110A-N. For example, if it is desired to activate a sensor, and the keyboard command (from the sensor's user manual) to activate the sensor is "<control>A", then switch 160 can be controlled to send a "<control>A" signal to the sensor. This embodiment may be particularly useful in rapidly evolving combat scenarios where there may not be sufficient time to program APIs for sensors 110A-N. Furthermore, combat personnel can rapidly interface any sensor regardless of their native (or proprietary) API to system 100.

Several external military units (e.g. robotic units) include a dedicated processor unit to allow a user to easily dismount from an armored vehicle and carry the external military unit. In an embodiment, switch 160 allows such external units (or any other classified units) to be interfaced with system 100 allowing a user to view outputs from these units on display 192.

Video Data Generator 170

In an embodiment, video data generator 170 converts an input VGA (Video Graphics Array) signal received from switch 160 into an NTSC/PAL (National Television System Committee/Phase Alternating Line) video signal. Other video signal formats known to those skilled in the art may also be used. In an embodiment, the VGA signal received by video data generator 170 corresponds to the data being displayed on display 192. Video data generator 170 also outputs a duplicate VGA signal simultaneously that corresponds to the data being displayed on display 192.

In this way, video data generator 170 allows any signal generated by system 100 to be displayed in both PC compatible (i.e. VGA) and/or TV (i.e. NTSC or PAL) compatible formats allowing the display output for system 100 to be connected to a VGA monitor or a projector/TV requiring NTSC signals.

Video Distributor 190

In an embodiment, video distributor 190 receives a combination of USB & VGA data from external devices 180A-N. As an example, such video data may correspond to data being displayed on displays (not shown) associated with external devices 180A-N.

Video distributor 190 may then split the VGA signals received from external devices 180A-N into one or more VGA output signals and a plurality of NTSC/PAL signals.

External devices 180A-N can be any external device that a user wants to interface with system 100. As an example, external devices 180A-N can be laptop computers or any computing device producing an output video signal. External devices 180A-N can be classified or unclassified.

Figure 1F:
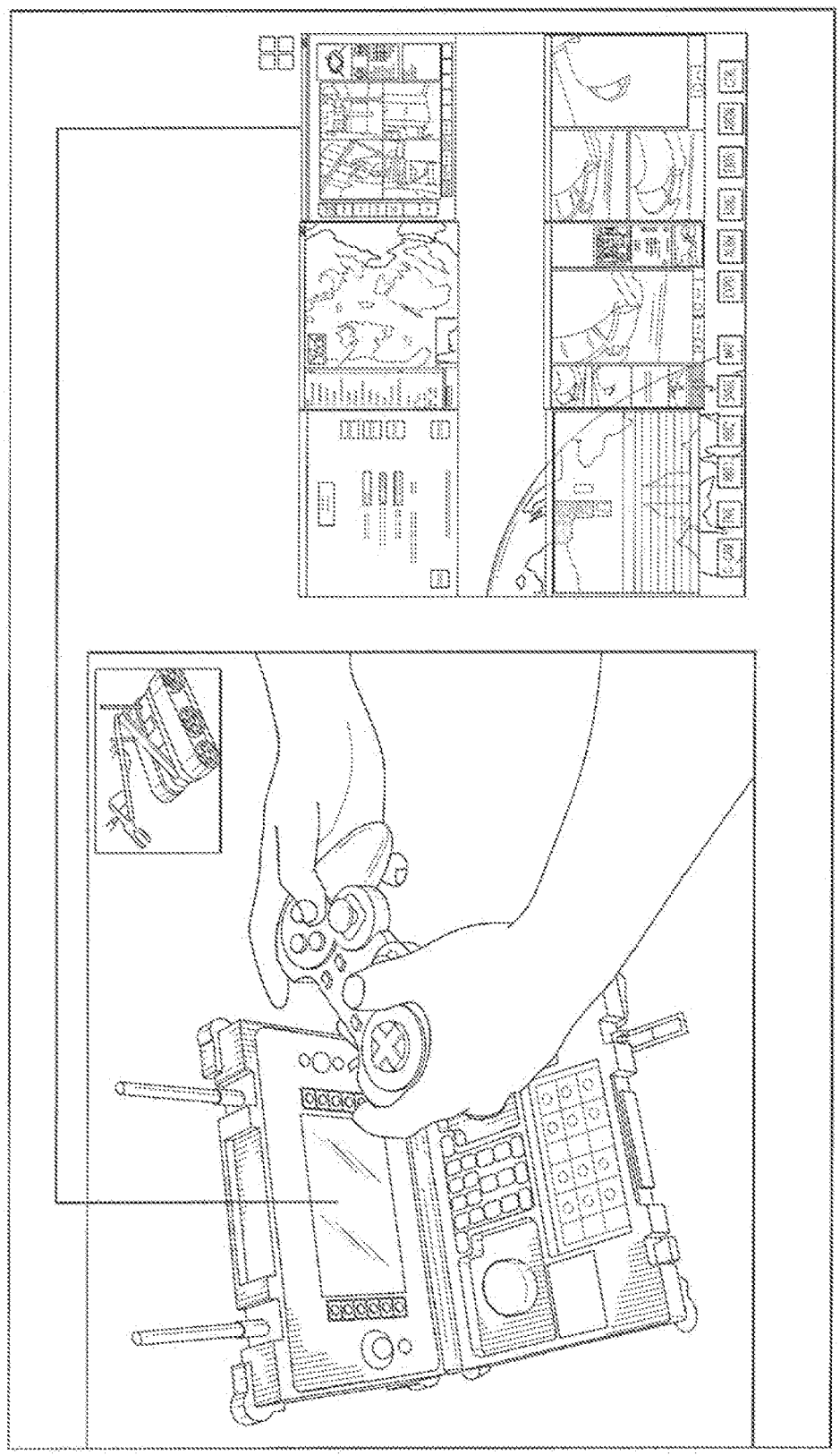
FIG. 1F illustrates an exemplary external device and an output of the external device, according to an embodiment of the invention.
Figure 1G:
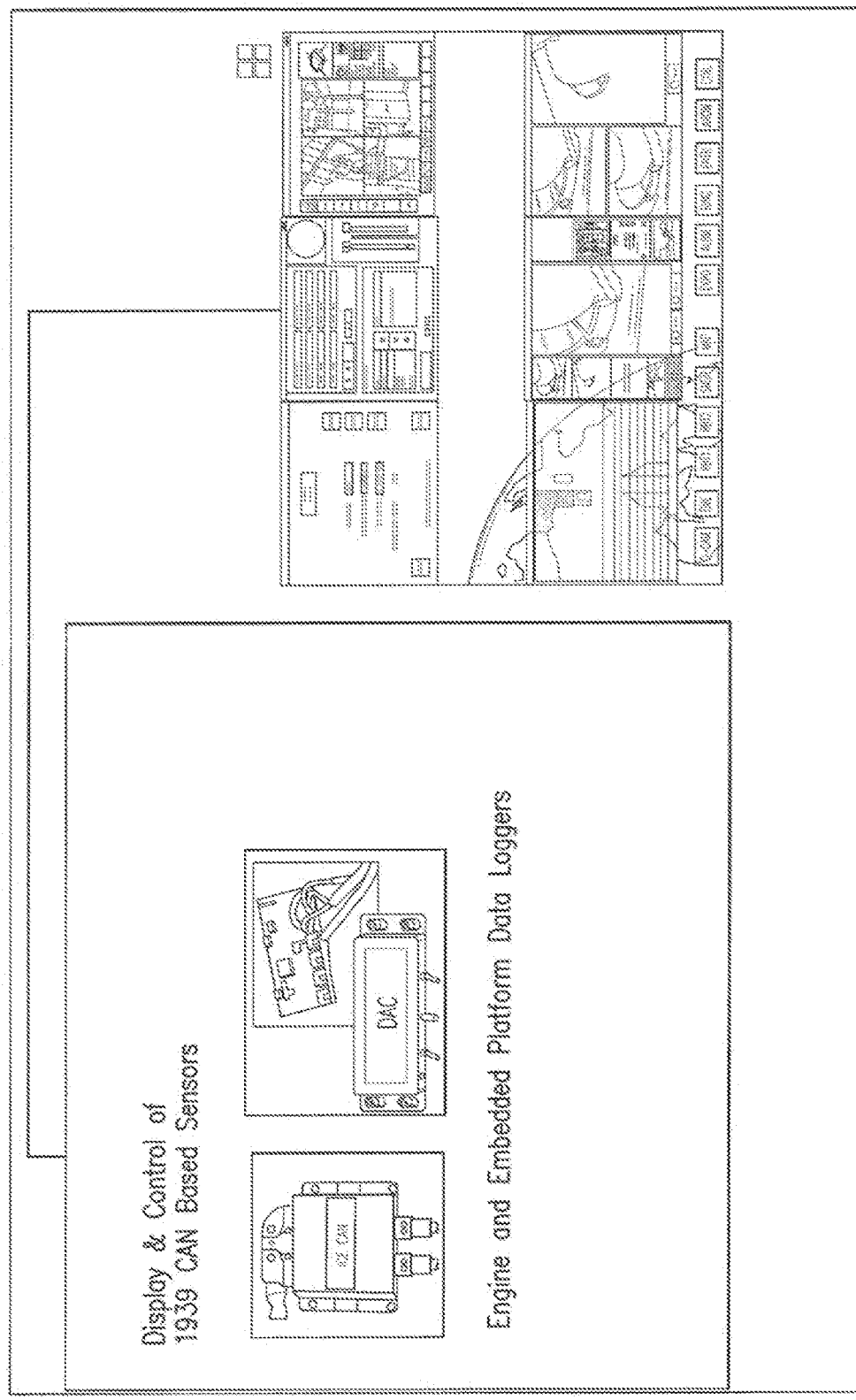
FIG. 1G is a diagram illustrating display of data received from exemplary sensors, according to an embodiment of the invention.

FIG. 1F is a diagram illustrating an exemplary external device 180A, the output of which is displayed on display 192 via video distributor 190. As shown in the FIG. 1F, the video output of external device 180A (e.g. a iROBOT® control console), is displayed on display 192 along with a plurality of other video streams from sensors 110A-N.

In an embodiment, external devices 180A-N can be connected to system 100 using an Ethernet port (e.g. RJ-45) associated with system 100.

In an embodiment, system 100 can gain access to video data from external modules 180A-N using protocols, including, but not limited to IP. In another embodiment, system 100 can communicate with external devices 180A-N using a wireless medium (e.g. WiFi).

Exemplary Operation of Stream Generator

Figure 2:
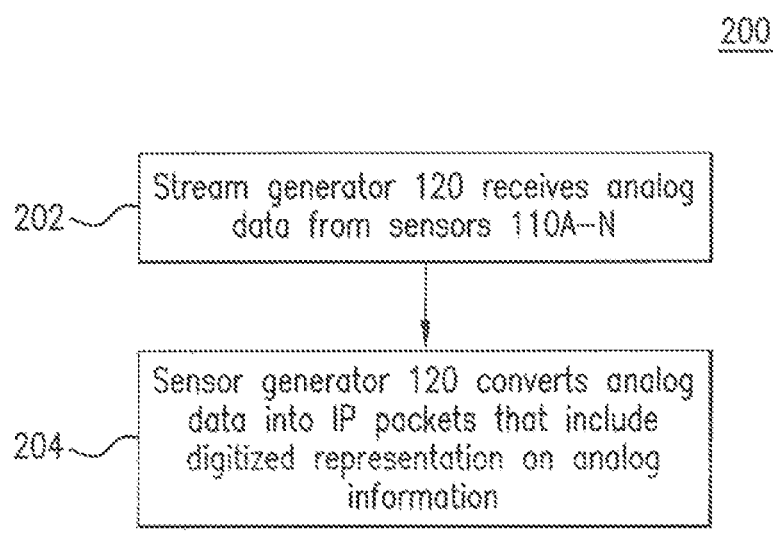
FIG. 2 is a flowchart illustrating an operation of a steam generator, according to an embodiment of the invention.

An exemplary operation of stream generator 120, according to an embodiment of the invention, will now be described in detail with reference to FIG. 2. FIG. 2 illustrates method 200.

Method 200 begins with stream generator 120 receiving analog data from sensors 110A-N (step 202). As an example, not intended to limit the invention, stream generator 120 may receive analog video signals from sensors 110A-N. In another example, stream generator 120 may receive temperature, barometric and pressure data from sensors 110A-N.

In step 204, stream generator 120 converts analog information received from sensors 110A-N into IP packets that include a digitized representation of the analog data received in step 202. As an example, stream generator 120 may receive analog video data from sensors 110A-N and then convert the analog video data into digital MPEG frames that are carried by IP packets across system 100.

In this way, stream generator 120 converts analog data received from sensors 110A-N into digital data carried by IP packets across system 100. Stream generator 120 thus allows a user to connect a plurality of sensors 110A-N that produce analog signals to system 100. Such operation of stream generator 120 is useful in constantly changing combat environments where armed personnel need to rapidly deploy new systems (e.g. sensors) to existing infrastructure. Such operation also helps in satisfying the need of the United States Department of Defense for an open-networked system design that incorporates multiple modular sensors, communication devices, and weapon systems into one networked architectural solution for armored vehicles.

Exemplary Operation of Display Processor

Figure 3:
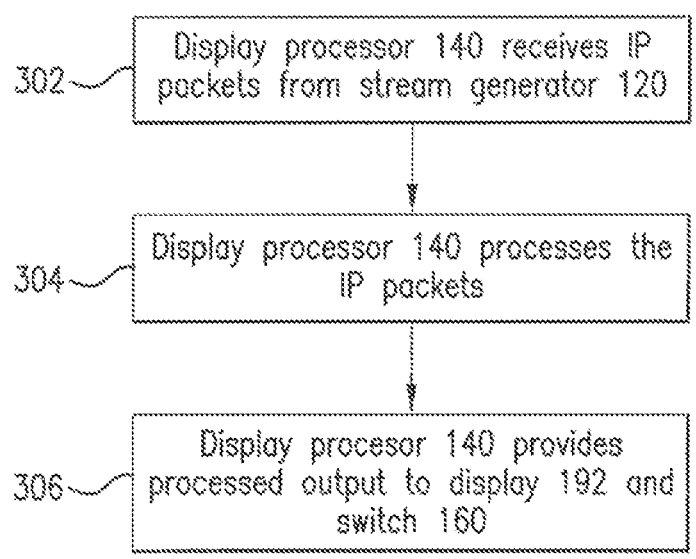
FIG. 3 is a flowchart illustrating an operation of a display processor, according to an embodiment of the invention.

An exemplary operation of display processor 140, according to an embodiment of the invention, will now be described in detail with reference to FIG. 3. FIG. 3 illustrates method 300.

Method 300 begins with display processor 140 receiving one or more IP packets as from stream generator 120 via router 130 (step 302). As an example, IP packets received from stream generator 120 may include a plurality of MPEG frames associated with video data retrieved from sensors 110A-N. Although method 300 is described in terms of IP, it is to be appreciated that any other protocol for transmitting data provided by sensors 110A-N may be used by stream generator 120. Furthermore, any other form of digital data other than MPEG frames can be transmitted.

In step 304, display processor 140 processes the IP packets received from stream generator 120. As described earlier, display processor 140 processes each MPEG frame using an image-processing algorithm that includes edge, motion, black and white and/or similarity detection techniques. Other image processing techniques may also be used by display processor 140 prior to providing the MPEG frames to display 192.

In step 306, display processor 140 provides the output of step 304 (e.g. image processed MPEG frames) to switch 160 and display 192. As an example, display processor 140 can provide the MPEG frames to display 192 at a configurable frame rate (e.g. 30 frames per second) to display a video on display 192.

In this way, display processor 140 processes data received from stream generator 120 for display. By processing data (or embedding information received from sensors 110A-N into MPEG frames), display processor 140 allows armed personnel to efficiently view information retrieved from a plurality of sensors 110A-N on a single display 192. For example, if sensor 110A is a video camera and sensor 110B is an altimeter, display processor can display both video information from sensor 110A and altitude information from sensor 110B in a single display. Alternatively, altitude information from sensor 110B can be embedded within video information from sensor 110A as described above. Furthermore, a user can plug-in any sensor device that has been sent to the user while the user is deployed in combat, allowing for system 100 to be reconfigurable.

Exemplary Operation of Video Distributor

Figure 4:
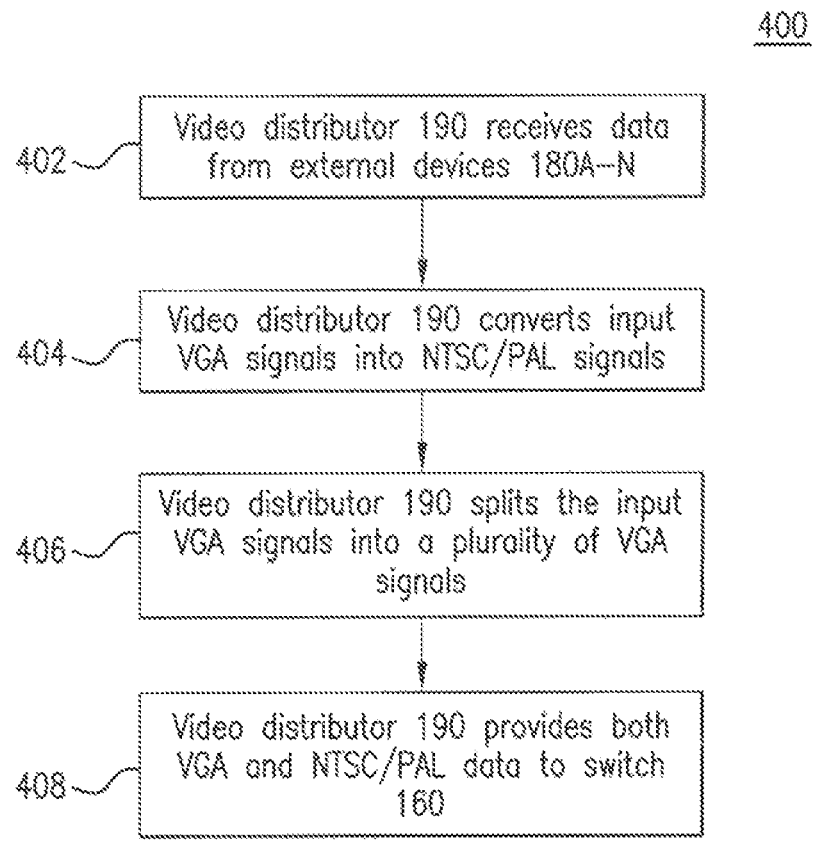
FIG. 4 is a flowchart illustrating an operation of a video distributor, according to an embodiment of the invention.

An exemplary operation of video distributor 190, according to an embodiment of the invention, will now be described in detail with reference to FIG. 4. FIG. 4 illustrates method 400.

Method 400 begins with video distributor 190 receiving analog video data (e.g. VGA signal) from external devices 180A-N (step 402). As an example, external devices 180A-N can be any external device(s) that a user wants to interface with system 100. As an example, external devices 180A-N can be laptop computers or any computing device producing an output video signal. External devices 180A-N, for example, can provide analog VGA signals to video distributor 190. In another example, video distributor 190 can receive a combination of USB & VGA signals from external devices 180A-N.

In step 404, video distributor 190 converts input VGA signals into output NTSC/PAL signals. Additionally, video distributor 190 generates duplicate VGA signals.

In step 406, video distributor 190 may split the VGA signals into one or more VGA output signals and NTSC/PAL signals. This can allow multiple outputs for video distributor 190.

In step 408, video distributor 190 provides both VGA and NTSC/PAL signals to switch 160. In an embodiment, switch 160 may provide the VGA and NTSC/PAL signals received from video distributor 190 to display processor 140. Display processor 140 may then display the video data corresponding to the VGA (or NTSC/PAL) signals on display 192.

In this way, video distributor 190 receives analog data from external devices 180A-N and provides video signals (e.g. VGA and NTSC/PAL) signals to display processor 140 through switch 160. Thus, video distributor 190 allows external devices 180A-N to be interfaced with system 100 such that video data from external devices 180A-N as well as sensors 110A-N is displayed on a single display 192.

Such operation of video distributor 190 is useful in constantly changing combat environments where armed personnel need to rapidly deploy new systems (e.g. laptops, sensors etc.) to existing infrastructure. Such operation also helps in satisfying the need of United States Department of Defense for an open-networked system design that incorporates multiple modular sensors, communication devices, and weapon systems into one networked architectural solution for armored vehicles.

Exemplary Operation of Video Data Generator

Figure 5:
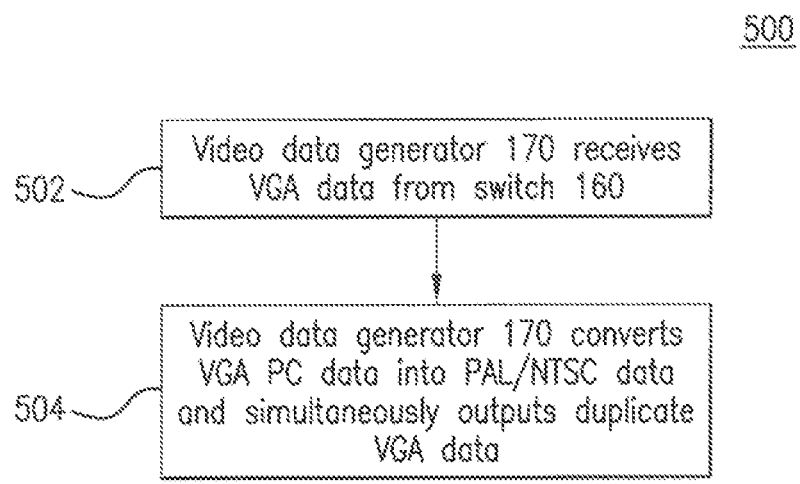
FIG. 5 is a flowchart illustrating an operation of a video data generator, according to an embodiment of the invention.

An exemplary operation of video data generator 170, according to an embodiment of the invention, will now be described in detail with reference to FIG. 5. FIG. 5 illustrates method 500.

Method 500 begins with video data generator 170 receiving a VGA signal from switch 160 (step 502). In an embodiment, this VGA signal corresponds to data displayed on display 192 by system 100.

In step 504, video data generator 170 converts the input VGA (or PC) signal received in step 502 into an PAL/NTSC (or TV) video signal. Video data generator 170 also simultaneously outputs a duplicate VGA signal corresponding to the input VGA signal.

In this way, video data generator 170 allows any video signal generated by system 100 to be displayed in both PC compatible and/or TV compatible formats. This allows video signals from system 100 to be connected to both VGA monitors or projector/TVs requiring NTSC signals.

Example Computer Embodiment

Figure 6:
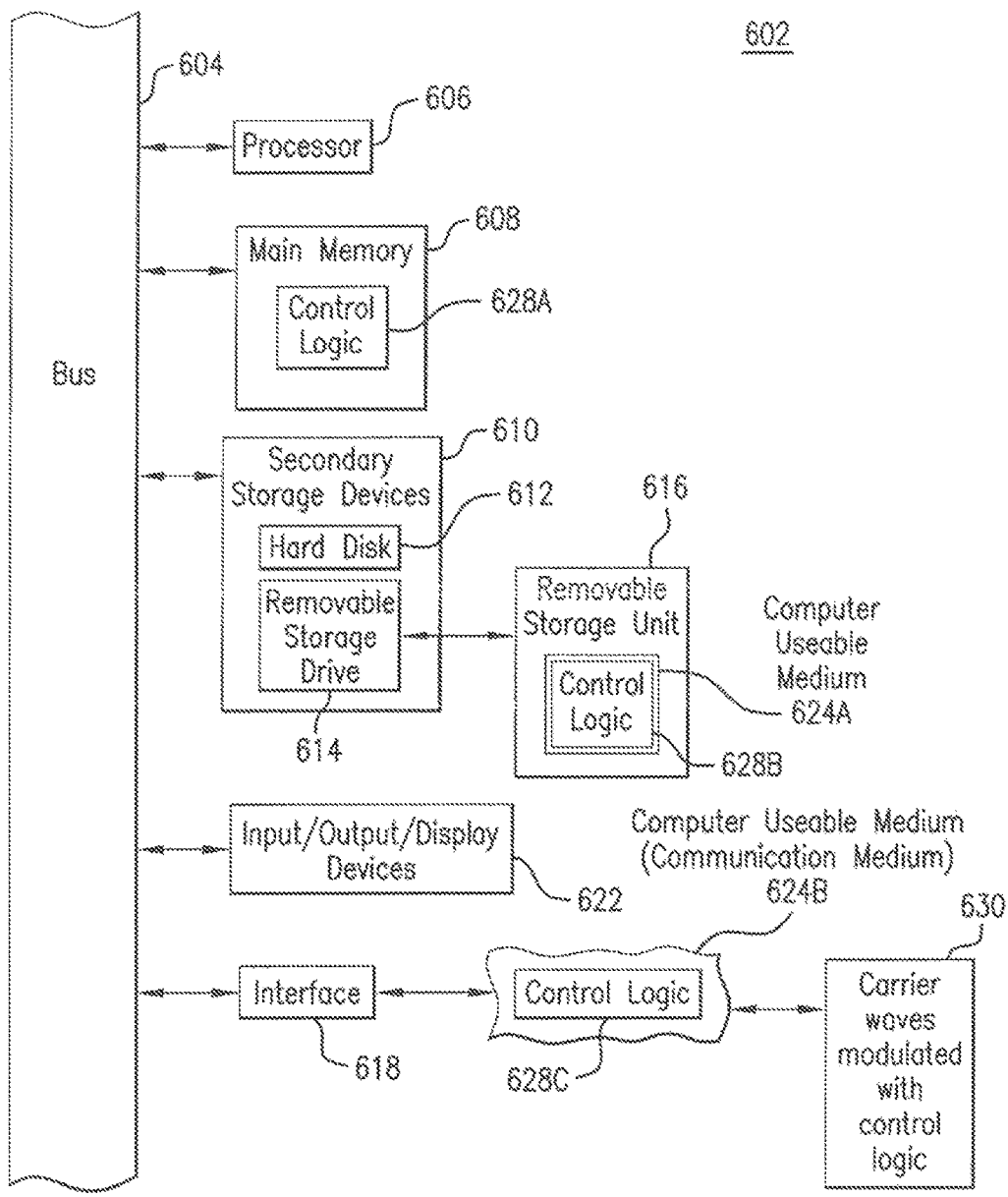
FIG. 6 illustrates an example computer useful for implementing components of embodiments of the invention.

In an embodiment of the present invention, the system and components of embodiments described herein are implemented using well known computers, such as computer 602 shown in FIG. 6. For example, stream generator 120 or display processor 140 can be implemented using computer(s) 602.

The computer 602 can be any commercially available and well known computer capable of performing the functions described herein, such as computers available from International Business Machines, Apple, Sun, HP, Dell, Compaq, Digital, Cray, etc.

The computer 602 includes one or more processors (also called central processing units, or CPUs), such as a processor 606. The processor 606 is connected to a communication bus 604.

The computer 602 also includes a main or primary memory 608, such as random access memory (RAM). The primary memory 608 has stored therein control logic 628A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624 having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 622, such as monitors, keyboards, pointing devices, etc.

The computer 602 further includes a communication or network interface 618. The network interface 618 enables the computer 602 to communicate with remote devices. For example, the network interface 618 allows the computer 602 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from the computer 602 via the communication medium 624B. More particularly, the computer 602 may receive and transmit carrier waves (electromagnetic signals) modulated with control logic 630 via the communication medium 624B.

Any apparatus or manufacture comprising a computer useable or readable medium having control logic (software) stored therein is referred to herein as a computer program product or program storage device. This includes, but is not limited to, the computer 602, the main memory 608, secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A reconfigurable data distribution system, comprising:
   a stream generator implemented at least in part in hardware, configured to:
      generate first data packets encapsulating first data received from a first sensor of a plurality of sensors and second data packets encapsulating second data received from a second sensor of the plurality of sensors, wherein the first sensor is configured to operate on a first vendor platform and the second sensor is configured to operate on a second vendor platform;
   a processor coupled to a memory having instructions stored thereon that when executed by the processor, causes the processor to:
      create a composite image for output to a display by embedding the first data into the second data, wherein the composite image simultaneously displays the first data and the second data; and
      control, using operational information comprising one or more control values, the plurality of sensors based at least in part on analyzing the first data or the second data.

2. The reconfigurable data distribution system of claim 1, further comprising:
   a switch configured to translate first control data received from an input device using the operational information and output the first control data to a sensor of the plurality of sensors.

3. The reconfigurable data distribution system of claim 2, wherein the switch is further configured to receive third data from an external device of a plurality of external devices to output to the processor.

4. The reconfigurable data distribution system of claim 3, the memory having instructions stored thereon that, if executed by the processor, causes the processor to:
   receive fourth data from a sensor of the plurality of sensors;
   detect a similarity between the third data and the fourth data; and
   embed the fourth data with the third data.

5. The reconfigurable data distribution system of claim 4, further comprising:
   a video distributor implemented at least in part in hardware, configured to:
      receive the third data comprising analog data;
      convert the third data into corresponding video signals; and
      output the corresponding video signals to the switch; and
   the memory having instructions stored thereon that, if executed by the processor, causes the processor to:
      receive at least one of the corresponding video signals from the switch; and
      output the at least one of the corresponding video signals to the display.

6. The reconfigurable data distribution system of claim 1, further comprising:
   a data repository coupled to the processor and configured to store at least one of the third data, the first data packets, or the second data packets.

7. The reconfigurable data distribution system of claim 1, wherein the reconfigurable data distribution system is integrated within a vehicle.

8. The reconfigurable data distribution system of claim 1, wherein the display comprises a single display.

9. The reconfigurable data distribution system of claim 1, the memory having instructions stored thereon that, if executed by the processor, causes the processor to:
  determine a geographical location associated with an action based at least on the analyzing the first data or the second data.

10. A method comprising:
  generating, by one or more processors, first data packets encapsulating first data received from a first sensor of a plurality of sensors and second data packets encapsulating second data received from a second sensor of the plurality of sensors, wherein the first sensor is configured to operate on a first vendor platform and the second sensor is configured to operate on a second vendor platform;
  creating, by the one or more processors, a composite image for output to a display by embedding the first data into the second data, wherein the composite image simultaneously displays the first data and the second data; and
  controlling, by the one or more processors, the plurality of sensors using operational information comprising one or more control values based at least in part on analyzing the first data or the second data.

11. The method of claim 10, further comprising:
  translating first control data received from an input device using the operational information; and
  outputting the first control data to a sensor of the plurality of sensors.

12. The method of claim 11, further comprising:
  receiving third data from an external device of a plurality of external devices to output.

13. The method of claim 12, further comprising:
  receiving fourth data from a sensor of the plurality of sensors;
  detecting a similarity between the third data and the fourth data; and
  embedding the fourth data with the third data.

14. The method of 13, wherein the third data comprises analog data, and the method further comprising:
  converting the third data into corresponding video signals; and
  outputting the at least one of the corresponding video signals to a display.

15. The method claim 10, further comprising:
  storing at least one of the composite image, the first data packets, or the second data packets in a data repository.

16. A non-transitory computer-readable device having instructions stored thereon that, when executed by at least one computing device, causes the at least one computing device to perform operations comprising:
  generating first data packets encapsulating first data received from a first sensor of a plurality of sensors and second data packets encapsulating second data received from a second sensor of the plurality of sensors, wherein the first sensor is configured to operate on a first vendor platform and the second sensor is configured to operate on a second vendor platform
  creating a composite image for output to a display by embedding the first data into the second data, wherein the composite image simultaneously displays the first data and the second data; and
  controlling, using operational information comprising one or more control values, the plurality of sensors based at least in part on analyzing the first data or the second data.

17. The computer-readable device of claim 16, further comprising:
  translating first control data received from an input device using the operational information; and
  outputting the first control data to a sensor of the plurality of sensors.

18. The computer-readable device of claim 17, further comprising:
  receiving third data from an external device of a plurality of external devices to output.

19. The computer-readable device of claim 18, further comprising:
  receiving fourth data from a sensor of the plurality of sensors;
  detecting a similarity between the third data and the fourth data; and
  embedding the fourth data with the third data.

20. The computer-readable device of 19, wherein the third data comprises analog data, and the method further comprising:
  converting the third data into corresponding video signals; and
  outputting the at least one of the corresponding video signals to a display.

21. The computer-readable device claim 16, further comprising:
  storing data at least one of the third data, the first data packets, or the second data packets in a data repository.

22. A method comprising:
  generating, by one or more processors, first data packets encapsulating first data received from a first sensor of a plurality of sensors and second data packets encapsulating second data received from a second sensor of the plurality of sensors, wherein the first sensor is configured to operate on a first vendor platform and the second sensor is configured to operate on a second vendor platform;
  creating, by the one or more processors, a composite image for output to a display device on a vehicle by embedding the first data into the second data, wherein the composite image simultaneously displays the first data and the second data;
  controlling, by the one or more processors, the plurality of sensors using operational information based at least in part on analyzing the first data or the second data, wherein the operational information comprises one or more controls values for the plurality of sensors; and
  displaying, by the one or more processors, the composite image on the display device on the vehicle.

23. The method of claim 22, further comprising:
  determining a location of a sensor in the plurality of sensors on the vehicle.

24. The method of claim 23, further comprising:
  mapping the location of the sensor in the plurality of sensors to a display function of the display device on the vehicle.

25. The method of claim 22, further comprising:
  repositioning a sensor in the plurality of sensors on the vehicle.

* * * * *

UNITED STATES PATENT AND TRADEMARK OFFICE
CERTIFICATE OF CORRECTION

PATENT NO. : 10,250,409 B2  
APPLICATION NO. : 14/448755  
DATED : April 2, 2019  
INVENTOR(S) : Glaros et al.

Page 1 of 1

It is certified that error appears in the above-identified patent and that said Letters Patent is hereby corrected as shown below:

On the Title Page

Item (57) In the Abstract, first sentence, please replace "Systems, methods and computer programs products" with --Systems, methods and computer program products--.

In the Claims

Column 13, Line 51, please replace "Storing at least one of the composite image," with --Storing at least one of the composite images--.

Column 14, Line 52, please replace "more controls values" with --more control values--.

Signed and Sealed this  
Nineteenth Day of May, 2020

Andrei Iancu  
*Director of the United States Patent and Trademark Office*